(12) United States Patent
Turner et al.

(10) Patent No.: US 7,003,554 B1
(45) Date of Patent: Feb. 21, 2006

(54) SYSTEM AND METHOD FOR DOWNLOADING PORTIONS OF A REMOTELY LOCATED NETWORK OBJECT TO PRODUCE A COMPLETELY DOWNLOADED LOCAL COPY OF THE NETWORK OBJECT

(75) Inventors: Doug Turner, San Jose, CA (US); Raman Tenneti, Los Altos, CA (US)

(73) Assignee: Netscape Communications Corp., San Jose, CA (US)

( * ) Notice: Subject to any disclaimer, the term of this patent is extended or adjusted under 35 U.S.C. 154(b) by 0 days.

(21) Appl. No.: 09/528,846

(22) Filed: Mar. 20, 2000

(51) Int. Cl.
*G06F 15/16* (2006.01)

(52) U.S. Cl. ............ 709/217; 709/219; 709/224; 709/231; 709/232; 717/172; 717/173

(58) Field of Classification Search ........ 709/217–219, 709/224, 231, 232; 717/172, 173
See application file for complete search history.

(56) References Cited

U.S. PATENT DOCUMENTS

| | | | |
|---|---|---|---|
| 5,727,156 A | 3/1998 | Herr-Hoyman et al. | 709/219 |
| 5,790,793 A | 8/1998 | Higley | 709/218 |
| 5,799,285 A | 8/1998 | Klingman | 705/26 |
| 5,870,559 A | 2/1999 | Leshem et al. | 709/224 |
| 5,870,767 A | 2/1999 | Kraft, IV | 707/501.1 |
| 5,893,127 A | 4/1999 | Tyan et al. | 707/513 |
| 5,905,248 A | 5/1999 | Russell et al. | 235/462.15 |
| 5,913,215 A | 6/1999 | Rubinstein et al. | 707/10 |
| 6,061,733 A * | 5/2000 | Bodin et al. | 709/233 |
| 6,237,039 B1 * | 5/2001 | Perlman | 709/237 |
| 6,338,094 B1 * | 1/2002 | Scott et al. | 709/245 |
| 6,339,785 B1 * | 1/2002 | Feigenbaum | 709/213 |
| 6,377,974 B1 * | 4/2002 | Feigenbaum | 709/203 |
| 6,477,522 B1 * | 11/2002 | Young | 707/2 |
| 6,618,758 B1 * | 9/2003 | Ubowski | 709/232 |
| 6,769,019 B1 * | 7/2004 | Ferguson | 709/219 |

OTHER PUBLICATIONS http://cvs-www.mozilla.org/webtools/bonsai/cvsblame.cgi?file=mozilla-org/html/projects/silentdl/index.html&rev=1.1&root=/cvsroot, last edited Jan. 13, 1999.*

* cited by examiner

*Primary Examiner*—Glenton B. Burgess
*Assistant Examiner*—Kevin Parton
(74) *Attorney, Agent, or Firm*—Erik B. Cherdak; Arent Fox, PLLC

(57) ABSTRACT

System and method for downloading portions of a remotely located network object to produce a completely downloaded local copy of the network object. The system and method include and involve a server facility and a software delegate. The server facility is configured to store and to serve the software delegate and a network object. The server facility is further configured to be accessed by a client via an electronic data network, such as the Internet and WWW. The software delegate can reside and be executed on a client, and is configured to control the downloading of portions of a network object from the server facility to the client via the electronic data network, until a completely downloaded copy is stored locally on the client.

5 Claims, 5 Drawing Sheets

```
au = SilentDownload.find("CoolSoftware")
if (au == null)
{
  au = new SilentDownloadTask();
  au.Init("CoolSoftware",
    "http://home.foo.com/download/5.1/SilentDownload.jar",
    "http://home.foo.com/download/5.1/SilentDownload.html");
} switch (au.state)
{
  case SilentDownloadTask.SDL_ERROR:
    au.Remove();
    break;
  case SilentDownloadTask.SDL_COMPLETE:
    au.Remove();
    // open the downloaded jar file, which puts up the
    // UI and does the install break;
}
```

FIG. 1B

SYSTEM AND METHOD FOR DOWNLOADING PORTIONS OF A REMOTELY LOCATED NETWORK OBJECT TO PRODUCE A COMPLETELY DOWNLOADED LOCAL COPY OF THE NETWORK OBJECT

BACKGROUND OF THE INVENTION

1. Field of the Invention

The present invention relates to systems and methods for downloading data from a network. More particularly, the present invention relates to the downloading and installation of remotely located files via the Internet and World Wide Web (WWW) to facilitate copying of the same.

2. Description of the Related Art

Personal Computers (PCs) are well known. People commonly use PCs to access information and to perform business on the Internet and WWW, as well as a multitude of other tasks, personal and commercial. Accordingly, software has been developed to run on PCs for virtually every conceivable use. And, people have become dependent upon their PCs and the software installed thereon, to assist them in running their households, businesses, agencies, etc. As such, software development and the inclusion of new, enhanced features to meet ever changing user needs, and distribution of such software have become important considerations in successfully marketing software packages.

Upgrading a client PC's software to a latest version has become increasingly important for a number of reasons. First, maintaining older versions of software can be very costly, both to end users and to software manufacturers. Second, it may become necessary to implement newer versions of software in order to fix bugs, close potential security holes, etc. Since PCs are so widely used in homes, offices, etc., accessing a user's PC to upgrade software is a universal problem.

There are several proposed solutions to the aforementioned problems associated with upgrading customer client software to newer versions. One proposed solution is to force software users to purchase an upgrade version packaged on a CD or magnetic disk(s). The software user must order the new software either in person at a store that sells such products, or over the phone, Internet, etc. Upon receipt, the software user must manually install the software onto his PC. The problem with this solution is that it forces software users to proactively procure the upgrade, and manually perform the upgrade, which may be complex and/or time consuming. Also, under this proposed solution, the process is not driven from the software manufacturer's end, and, therefore, the manufacturer may be forced to maintain older versions of the software in order to support users who fail to or refuse to perform timely upgrades, which could be very costly to the manufacturer.

Another proposed solution is to notify the user via an email mailing list (or other notification means) when new software is available. In the email, a download web site may be provided that the user can access to download the software upgrade via the Internet. Once the software is copied to a user's local machine, the user then must manually install the program via some sort of installation software and procedure. The problem with this second proposed solution is twofold.

First, the user must still download the software upgrade in the foreground of the computer, which takes up important network and computing bandwidth and minimizes the users ability to perform other tasks. Computer programs can be rather large in size and downloads can take a relatively long time (such as when downloading megabytes of program data via a 28.8 modem, for example). For example, over a conventional modem, a 10 Megabyte download could take hours to complete. Because of this, a second problem with this proposed solution is realized in that users tend to postpone these types of upgrades, which defeats the natural purpose of the upgrade. That is, this proposed solution encourages a user to delay upgrades which may be necessary, for example, for security reasons, bug fixes, etc. and therefore should be installed immediately or at least in a pre-conceived timely fashion. Therefore, this second proposed solution also poses a problem to software manufacturers by causing them to maintain older versions of the software in order to support users who fail to or refuse to perform timely upgrades.

Thus, there exists a need to provide new and improved systems and methods to solve the aforementioned problems associated with updating software packages and the like. To be viable, such systems and methods must be implemented without causing significant burdens to network infrastructures or undue increases in infrastructure costs.

SUMMARY OF THE INVENTION

In view of the foregoing comments regarding the related art, an object of the present invention is to solve the aforementioned problems. It is another object of the present invention to provide new and improved systems and methods for downloading portions of a remotely located network object to produce a completely downloaded local copy of the network object.

These and other objects of the present invention are achieved by providing a system for downloading portions of a remotely located network object. The system includes a server facility and a software delegate. The server facility is configured to store and to serve the software delegate and a network object. The server facility is further configured to be accessed by a client via an electronic data network, such as the Internet and WWW. The software delegate can reside and be executed on a client, and is configured to control the downloading of portions of a network object from the server facility to the client via the electronic data network, until a completely downloaded copy is stored locally on the client.

According to another aspect of the present invention, provided is a system for downloading portions of a remotely located network object. The system includes a server facility, a software delegate and a client. The server facility is configured to store and to serve the software delegate and a network object. The server facility is further configured to be accessed via an electronic data network, such as the Internet and WWW. The client is configured to access the server facility via the electronic data network and to download and execute the software delegate. The client is further configured to download portions of the network object in accordance with the executed software delegate, until a completely downloaded copy of the network object is stored locally on the client.

And, according to another aspect of the present invention, provided is a method for facilitating downloading portions of a remotely located network object. The method comprises the steps of: using a client computer to access a server facility via an electronic data network, such as the Internet and WWW; receiving portions of a network object from server facility and storing the portions of a network object on the client computer until a completely downloaded copy of the network object is created locally; and controlling a size of each portion of the network object received from the server facility.

BRIEF DESCRIPTION OF THE DRAWING FIGURES

The present invention is described in detail below with regard to the attached drawing figures, of which:

FIG. 1B is a representation of Java Script and pseudo-code that may be used to facilitate downloading portions of a remotely located network object to produce a completely downloaded local copy of the network object according to a preferred embodiment of the present invention;

Figure 3:
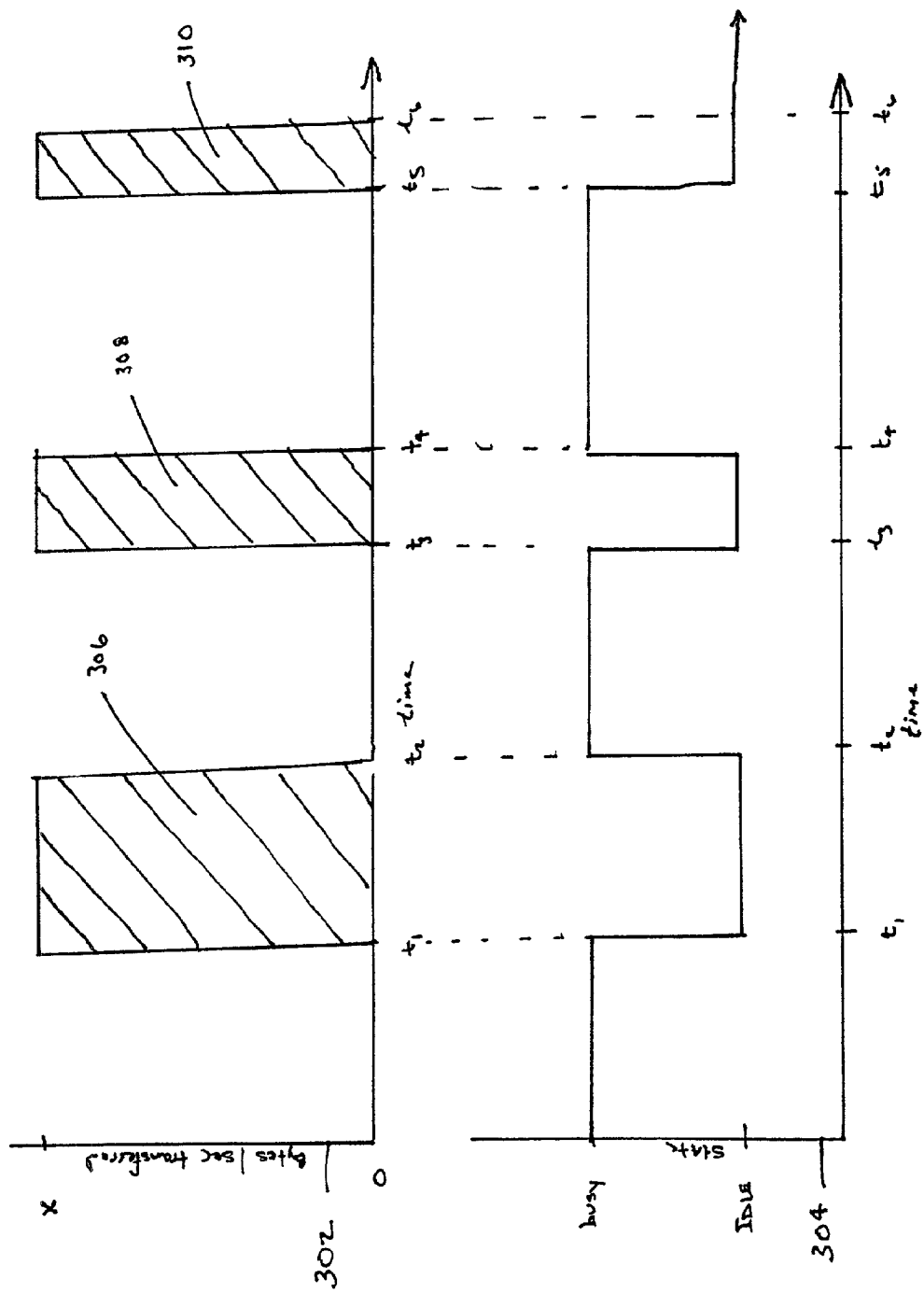
Figure 4:
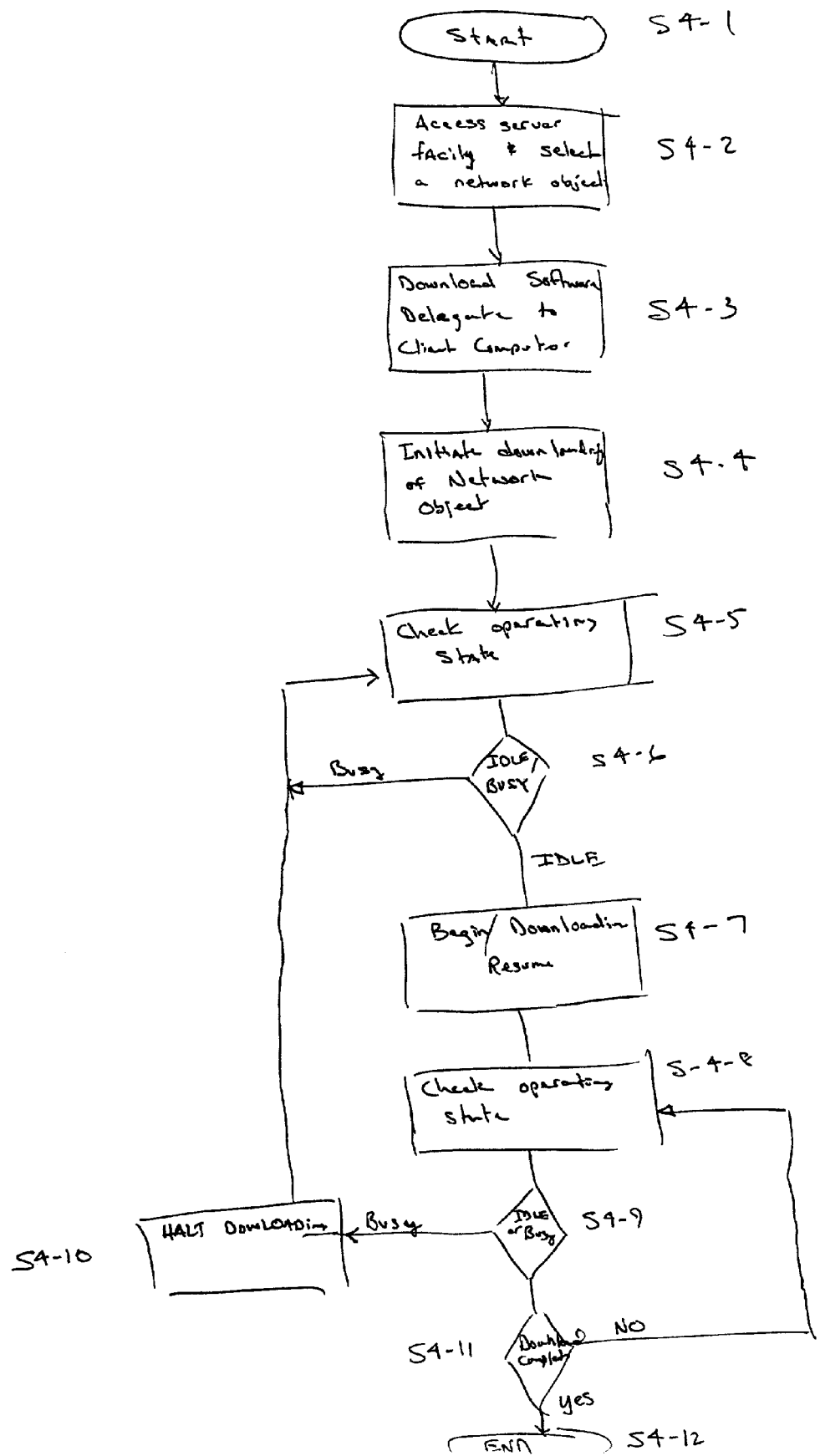

FIG. 3 is graphical representation of data flowing from the server facility to the client during the downloading of portions of a remotely located network object according to a preferred embodiment of the present invention; and FIG. 4 is a flowchart that illustrates a method for downloading portions of a remotely located network object to produce a completely downloaded local copy of the network object according to a preferred embodiment of the present invention.

DETAILED DESCRIPTION OF THE PREFERRED EMBODIMENTS

The present invention is now discussed with reference to the drawing figures that were briefly described above. Unless otherwise specified, like parts and processes are referred to with like reference numerals.

In the discussions that follow, the terms:

Network Object means any object like or similar to a software object (e.g., a computer program or data, etc.) that may be stored on or within a computer readable medium, (e.g., as a document, an executable file, a ZIP file, etc.) There is no requirement that a network object be stored in any particular geographic location or that such an object be stored within a system making a node in any particular network such as the Internet. A network object may be stored in any fashion such that a downloading system may access the network object and copy the same to locally usable space (e.g., a local hard drive). Accordingly, downloading as that term is used in the context of the present invention is not limited to any particular type of connection (e.g., a modem connection, etc.) and is meant to refer to the process by which data is copied from one location (e.g., a network accessible location, etc.) to another location; and Pseudo-code means an outline of a program, written in a form that can be converted into real programming statements by those skilled in the art.

Figure 1A:
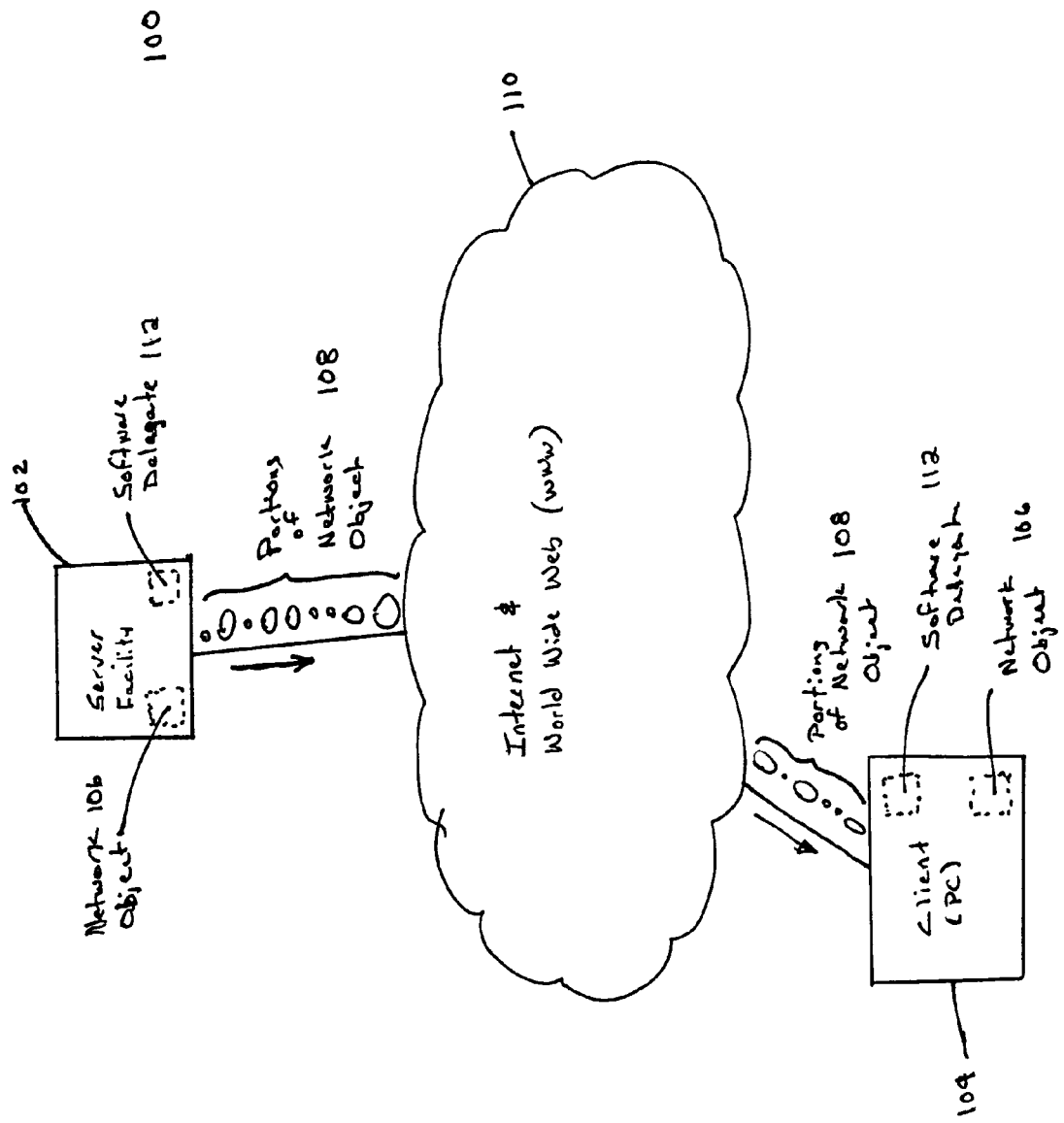
FIG. 1A is a block diagram of a system for downloading portions of a remotely located network object such as a software package (e.g., a new version of a software program, etc.) to produce a completely downloaded local copy of the network object according to a preferred embodiment of the present invention.

To illustrate salient features of the present invention, reference first is made to a system for downloading portions of a remotely located network object to produce a completely downloaded local copy of the network object. Referring now to FIG. 1A, a system 100 includes a server facility 102 configured to be accessed by a client 104 via the Internet and World Wide Web (WWW) 110.

Server facility 102 is configured to store and to serve network object 106 and software delegate 112. Server facility 102 may be any known computer server, web server, LAN server, etc. Server facility 102 could be accessed via a web site or by other conventional means (i.e., network address, etc.). Client 104 is configured to access server facility 102 via WWW 110, to download software delegate 112, and to execute software delegate 112. Client 104 may be any well known computer system, such as a personal computer, which can be configured to download and execute software delegate 112, for example, via a web browser, such as the NETSCAPE COMMUNICATOR® suite of client products (e.g., web browser, mail client, etc.) manufactured by NETSCAPE COMMUNICATIONS CORP., and which may be configured to access a web site associated with server facility 102. Although a preferred embodiment of the present invention is configured to facilitate the downloading of portions of a network object via the Internet and WWW, the invention is not so limited. For example, portions of a network object may be downloaded from a server facility to a client via a LAN, dedicated line, etc.

The execution of software delegate 112 begins a downloading process on client 104 and controls the downloading of network object 106 from server facility 102 to client 104 in accordance with the present invention. Software delegate 112 is capable of determining an operating state of client 104, such as "Idle" or "Busy" states. Software delegate 112 is capable of starting and stopping the downloading of network object 106 in accordance with the present invention in order to maximize the resources available for client 104. For example, software delegate 112 can download portions of network object 106 during an "Idle" state of client 102 and stop downloading during "Busy" states (e.g., when other local programs require local computing resources), thus downloading portions of network object 106 when a network library is idle. An example of this process is graphically represented and described in more detail with regard to FIG. 3.

Portions 108 (possibly of disparate sizes) of network object 106 are shown travelling from server facility 102 and being downloaded to client 104. Portions 108 of network object 106 continue to be downloaded to client 104 until a local copy of network object 106 is fully downloaded and stored on client 104 as shown.

Next, reference is made to FIG. 1B, shown therein is an example of Java Script and Pseudo-code that may facilitate the downloading of portions of a remotely located network object to produce a completely downloaded local copy of the network object according to a preferred embodiment of the present invention. Referring to the FIG. 1B with "120" SilentDownloadTask is a constructor. The first time that script 120 is run, the query for CoolSoftware will fail. Since variable au is NULL, a new SilentDownloadTask will be started. The task is initialized by passing in a key value, such as a URL to download and a script to call back to. Preferably, the key value is a human readable string. This value can be presented to users in a user interface. The callback script is a script which may be called when the state of the SilentDownloadTask changes or when SilentDownload first starts up.

Once initiated, SilentDownloadTask will execute a download process as a background operation running within a client computer such as client 104 (FIG. 1A). For example, SilentDownloadTask can check the client computer's state to see if it is "Idle" (network library is idle) at a set interval (e.g., every second). SilentDownloadTask can download a range of bytes to an Outfile on the client computer during an "Idle" state and store the last byte downloaded. During "Busy" states (network library is busy), SilentDownloadTask will suspend the download and wait for a new "Idle" state. SilentDownloadTask will resume the suspended download, starting at the next byte, at the next "Idle" state.

Periodically, the SilentDownload task will call the JavaScript which is passed into the Init( ) function of SilentDownloadTask. This javascript should have, preferably, the same format as script 120.

Note that script 120 handles two state changes: SDL_ERROR and SDL_COMPLETE. SDL_ERROR means that an irrecoverable error occurred in the execution of the script, and therefore, the process should be cancelled, resources should be cleaned-up, and a new process should be initiated. SDL_COMPLETE means that script 120 has completed successfully and a local copy of a network object has been created. Other states may be handled, however, at least these two states should be handled.

A number of scripts, methods, or APIs may be used to facilitate the downloading of portions of the a remotely located network object. For example, methods could be written that suspend and resume the SilentDownloadTask, that clean up data downloaded and entries from a persistent store, and will be immediately apparent to one of ordinary skill in the art.

Figure 2:
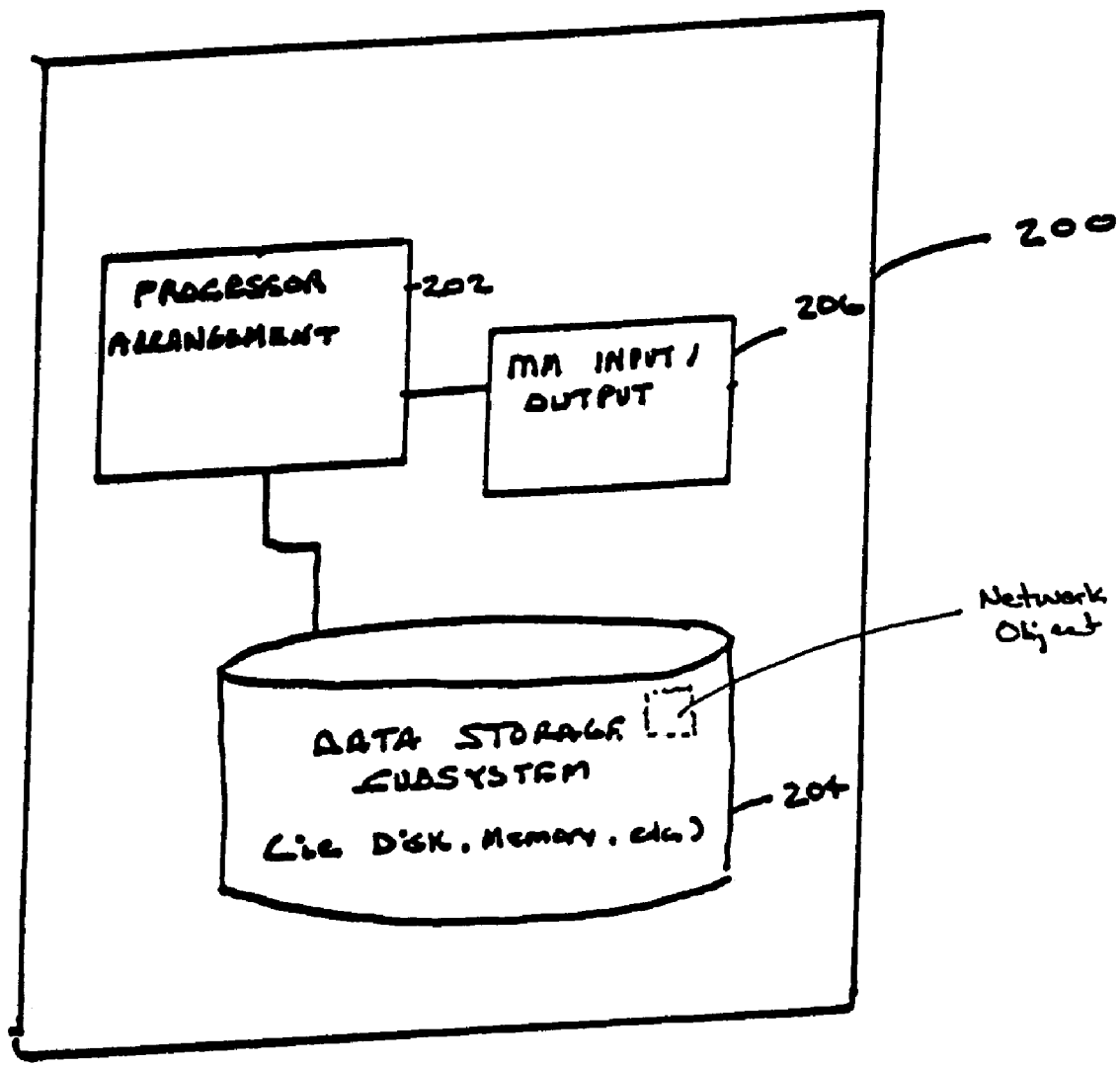
FIG. 2 is a block diagram that illustrates an automatic data processing system (ADP) which may be configured to facilitate a system for downloading portions of a remotely located network object to produce a completely downloaded local copy of the network object according to a preferred embodiment of the present invention.

Next, reference is made to FIG. 2, depicted therein is a block diagram of an automatic data processing system (ADP) which may be used to facilitate a system for downloading portions of a remotely located network object to produce a completely downloaded local copy of the network object according to a preferred embodiment of the present invention. ADP 200 includes a processor arrangement 202, a data storage subsystem 204, and a multimedia input and output device 206. ADP 200 may be configurable to operate as a server facility 102 and as a client 104. As such, ADP 200 can store and serve a network object 106 or software delegate 112. ADP 200 is configurable to execute software delegate 112 in such a way that software delegate 112 may access and download portions of network object 106 to data storage subsystem 204 and control the downloading based on an operating parameter of ADP 200, such as "Idle" or "Busy."

Next, reference is made to FIG. 3, depicted therein is a graphical representation of data flowing from the server facility to the client during the downloading of portions of a remotely located network object according to a preferred embodiment of the present invention. In particular, graph 302 represents data transfer versus time, and graph 304 represents an operating state of a client 104 versus time. Notice at time t1 the operating state of client 104 shifts from "Busy" to "Idle." Accordingly, software delegate 112 begins the downloading of network object 106 at a rate of $\chi$ bytes per second. At time t2, the operating state of client 104 shifts back to "Busy", and, accordingly, the downloading is suspended to in order to maximize the resources of client 104. Likewise, the process repeats itself downloading data between times t3 and t4, suspending downloading between times t4 and t5, and resuming downloading again between times t5 and t6. At t6, network object 106 is completely downloaded and the process stops.

The shaded areas 306, 308 and 310 represent portions of network object 106, and together they represent the entire network object 106. Each portion may vary in size based on the current operation of client 104. For example, a user may begin a downloading process in accordance with a preferred embodiment of the present invention, and then continue to perform various tasks using the client, such as writing a document within a word processor. During the time of the download, the client may be in a "Busy" state for relatively long periods of time with very small "Idle" state times. Accordingly, small portions of the network object 106 may be downloaded with large gaps in time between each download, until the entire network object is downloaded. Conversely, if a user stops working on the client 104, there may be a lengthy "Idle" state time, and very large portions of a network object 106 may be downloaded. Therefore, the size of each portion and the length of the time of the download may vary substantially based on the use of the client. In order to support the downloading of a network object in portions as described above, the client 104 and software delegate 112 preferably should support the use of Byte Ranges or some similar protocol.

Referring now to FIG. 4, depicted therein is a flow chart that further illustrates a method for facilitating the downloading of portions of the remotely located network object to produce a completely downloaded local copy of the network object according to a preferred embodiment of the present invention. Processing and operations begin at step S4-1 and immediately proceed to step S4-2. At step S4-2, a user accesses a server facility, such as server facility 102, and selects a network object to be downloaded. Access may be made via an electronic data network, such as the Internet and WWW. As described above in reference to FIG. 1A, the server facility may be accessed via a web site and access can be made from any client computer system configured to access the WWW and to run a web browser, such as NETSCAPE COMMUNICATOR®. Processing proceeds to step S4-3.

At step S4-3, a software delegate is served by the server facility to the client computer. Such a software delegate could be software delegate 112 as described in reference to FIGS. 1A and 1B. Processing proceeds to step S4-4. At step S4-4, the software delegate initializes a download process on the client computer. This can be accomplished by executing the software delegate on the client computer as described in reference to FIGS. 1A and 1B. The next step is step S4-5. At step S4-5, the software delegate accesses the client computer operating system and checks the operating state of the client computer, such as "Idle", "Busy", etc. Processing proceeds to step S4-6 where the operating state is evaluated. The operating state is evaluated so that the resources of the client computer may be maximized, thus increasing performance. If the operating state is "Busy", processing returns to step S4-5. If the operating state is "Idle", processing proceeds to step S4-7. At step S4-7, the software delegate begins downloading the network object at a certain rate (i.e., bytes per second; rate may be a factor of bandwidth, client performance, predetermined, etc.). If a portion of the network object has been downloaded already, the software delegate will check to determine the last range of bytes downloaded and will resume downloading (start a new portion of the network object) at the next range of bytes. The software delegate stores the portions of the network object in such a way that when the last portion is downloaded, a local copy of the network object is stored on and available to the client computer. Next processing proceeds to step S4-8.

At step S4-8, the software delegate again checks the operating state of the client computer. The operating state is evaluated next at step S4-9. If the operating state is "Busy", processing proceeds to step S4-10, otherwise, if the operating state is "Idle", processing proceeds to step S4-11. At step S4-10, downloading is suspended, thus completing the downloading of a portion of the network object. Note that the size of the portion is dependent upon the state changes of the client computer, and therefore, will vary in size based upon the use of the client computer. Processing proceeds from step S4-10 back to step S4-5.

At step S4-11, the software delegate checks to see if the network object has been completely downloaded. If the downloading is not complete, processing return to step S4-8. Otherwise, the download is complete, and processing terminates at step S4-12.

Although a preferred embodiment of the present invention is configured to facilitate the downloading of portions of a network object via the Internet and WWW, the invention is not so limited. For example, portions of a network object may be downloaded from a server facility to a client via a LAN, dedicated line, etc. Well know standards of coding, such as those utilized with Java and JavaScript, may be used to facilitate the method described above, and will be readily apparent to one of ordinary skill in the art.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for downloading portions of a remotely located network object, comprising:

a client;

a server facility configured to be accessed via an electronic data network by said client and to send data corresponding to at least one portion of a network object to said client via electronic data network;

a software delegate capable of residing on said client and configured to control an amount of said data and a size of said at least one portion of said network object to be downloaded from said server facility to said client independent of a user of said client and based solely upon an operating state of said client; and a client agent, configured to run on an automatic data processing system, to access a storage facility of said automatic data processing system, to access said server facility via said electronic data network to receive said software delegate, and to receive data from said server facility via said electronic data network in accordance with said software delegate.

2. The system according to claim 1, wherein said client agent is an Internet browser and said electronic data network is the Internet.

3. The system according to according to claim 1, wherein said software delegate is a Javascript applet.

4. The system according to claim 1, wherein said amount of data is a range of bytes and said size of at least one portion is dependent on said operating state.

5. The system according to claim 1, wherein said operating state is an idle state.

* * * * *